March 9, 1943.  F. H. HOGE  2,313,548
GEAR SPEED REDUCERS AND THE LIKE
Filed April 1, 1942   6 Sheets-Sheet 1

Fig. 1.

Inventor:
Frederick H. Hoge,
by Thos. A. Lanning
Atty.

Fig. 2.

March 9, 1943.  F. H. HOGE  2,313,548
GEAR SPEED REDUCERS AND THE LIKE
Filed April 1, 1942  6 Sheets-Sheet 4

Inventor:
Frederick H. Hoge

Fig. 5.

March 9, 1943.　　　　　F. H. HOGE　　　　　2,313,548
GEAR SPEED REDUCERS AND THE LIKE
Filed April 1, 1942　　　6 Sheets-Sheet 6

Inventor:
Frederick H. Hoge,
by
Atty.

Patented Mar. 9, 1943

2,313,548

UNITED STATES PATENT OFFICE 2,313,548

GEAR SPEED REDUCER AND THE LIKE

Frederick H. Hoge, Oak Park, Ill.

Application April 1, 1942, Serial No. 437,105

9 Claims. (Cl. 74—421)

This invention relates to improvements in gear speed reducers, and the like. In its broader aspects the invention concerns itself especially with gear speed reducers in which the final or "low" speed shaft is mounted vertically (although the device may also be used for applications in which other directions of said shaft are desired), and in order to show certain of the benefits and objects to be attained by the novel features herein disclosed I shall mention one particular application of the features of my present invention, without intending to limit myself to such application and use, except as I may do so in the claims to follow.

The gear speed reducers herein disclosed have been designed and developed with particular reference to driving conveyors of the industrial type, such as are extensively used in various manufacturing and assembly plants. These conveyors are used for transporting machines and parts from one location to another in the plant, and generally include chain runs to which are attached or connected suitable holders for the parts to be conveyed. These chain runs travel in closed circuits, and over suitable wheels or sprockets; and usually these wheels or sprockets are journalled on vertical shafts, so that said wheels or sprockets rotate in horizontal planes. In many cases such conveyors travel through extensive portions of the plants, from room to room, and around corners, and also in many cases they are so laid out as to travel from one elevation to another; always, however, returning to the starting point of the system. In other words, they run on closed circuits of travel.

Usually the holders which directly carry the parts being conveyed are suspended from pulleys or rollers which travel along suitable trackways or rails adjacent to the chain runs, so that the loads of such holders and their loads are not carried by the chain runs themselves; but said chain runs have to transmit the pulls to move said holders along their trackways. Said holders may be close together, or at frequent spacings, so that a chain of considerable length may have to move a great total load along the rails, and the necessary pull on such chain may be very large when operating the holders well loaded. This load may be aggravated in cases of runs uphill, where the loads must be raised to higher levels. Descending runs may tend to offset such rising runs, but the friction of the parts along the rails will largely offset any such gain for a short distance.

It is further noted that the loads on the holders will change as said holders are loaded and unloaded by setting production parts on said holders or removing said parts therefrom, so that the conditions of loading at various sections of the runs may change greatly from time to time. Furthermore, if the holders along one run of the system are operating well loaded, and the holders along the return or other run of the system are operating empty, it is evident that the total load imposed on the chain circuit will be the result of an unbalanced loading condition.

Usually these chain runs are driven along by suitable drives to the sprockets over which the chain runs travel. In some cases it may be found sufficient to make provision for driving a single sprocket at a suitable location in the circuit. In such case it is evident that the full pull necessary to drive the entire circuit must be developed by the single driving sprocket which has been selected for that purpose; and in such case the pull on the outgoing portion of the chain circuit must be communicated from the returning portion of the chain circuit by pull delivered over one or more idler sprockets or wheels. Furthermore, if in such case the holders on the outgoing portion of the circuit are well loaded, the pull necessary to move them must be communicated over such idler sprockets or wheels, with attendant disadvantages. It is therefore sometimes the practice to provide means to drive two or more sprockets or wheels, located at suitable points in the circuit to ensure good distribution of pulling loads over the system.

Now the driving of each of these "power" sprockets or wheels requires the delivery of power thereto on a vertically extending shaft, but it is generally desirable to make use of a driving motor therefor having a horizontally extending shaft, thereby avoiding certain disadvantages inherent in vertical shaft motors. Suitable drive means must therefore be provided in the system for changing from the horizontal motor shaft condition to that of verticality. Furthermore, when the driving chain runs are located overhead, as in the structural frame of the plant, the holders being also suspended from tracks carried by such frame, it is necessary to make provision for mounting the driving motor and gear reductions in or on such structural frame. In such case it is also necessary to make provision for supporting the vertical shaft which carries the sprocket with sufficient rigidity to give proper support to such sprocket, taking account of the very heavy pulls which must be transmitted to the chain runs, and in order to avoid twisting or deflection of the sprocket shaft under load. This requires the provision of suitable shaft bearings for such vertical sprocket shaft, located at considerable vertical separation from each other, and of suitable design. Furthermore, the foregoing arrangement makes it desirable to make provision for placement of the driving motor above the framework or structure on which the driving unit is placed, with the lower sprocket end of the vertical shaft reaching below such framework or structure, the unit itself being supported by the framework or structure in suitable and rigid manner.

Heretofore it has been customary to provide a suitable vertical shaft section, having the sprocket or wheel on its lower end, and a suitable spur gear or the like on its upper end, such vertical shaft unit reaching through the structural frame, to which it is attached. In such case it has also been the custom to provide an open spur gear on the upper end of such shaft; and also to provide a separate or distinct unit for driving such spur gear from the driving motor, and through the medium of a worm meshing with a worm gear. In other words, it has heretofore been the custom to effect the driving of such sprocket or wheel through the medium of two units, and through the use of open spur gears.

Sometimes it is desirable to place the conveyors along low levels, close to the floor; and in such cases it is necessary to place the sprocket (driving) on the upper end of a suitable vertical shaft, the arrangement being substantially reversed as compared to that previously explained herein.

The main object of the present invention is to provide a completely self-contained driving unit, including the vertical shaft for the driving sprocket or wheel, carried by one end of such shaft, the drive gear carried by the other end of such shaft, suitable bearings for the upper and lower ends of such shaft, and rigidly supported by a frame portion of the unit, which is adapted to extend down through the structural frame by which the unit is supported, with the upper portion of such unit above the frame or structure by which the unit is supported; and with suitable means to drive such vertical shaft, generally in the form of an intermediate shaft mounted on a vertical axis, and having driving connection to the drive gear above mentioned, together with a worm and worm gear drive for such intermediate shaft, from a suitable driving motor or other suitable drive, such as a belt driven pulley, carried by or close to the unit, with such driving element shaft horizontal. In other words, to provide a self-contained unit including all the foregoing elements arranged and designed to effect drive from the horizontal "high" speed shaft, above the supporting structure, and in line with the motor shaft, to the vertical "low" speed shaft, extending downwardly from the elevation of such motor shaft drive to the level of the sprocket or wheel, and with the drive effected by a double reduction, namely, a worm and worm gear between the "high" speed or motor shaft, and the intermediate shaft, and a spur or other suitable gear reduction from the intermediate shaft to the vertical or "low" speed shaft.

In connection with the foregoing it is a further object to make provision for effective lubrication of all the moving parts, including the several gears, and also including the upper and lower bearings of the low speed shaft. Such lubrication is effected by provision of a suitable oil bath for the reduction gears, both worm and other, and with provision for effectively preventing access of any of such lubricating oil to the lower end portion of the vertical shaft, thereby preventing any leakage of oil down along the vertical shaft, and also avoiding the need of any seal against such oil leakage at the lower end of the vertical shaft. In connection with the foregoing it is a further object to provide for sealed grease lubrication of both upper and lower ends of the vertical shaft, since such sealed grease lubrication may be effected without interference from the presence of any oil of the oil bath above mentioned.

It is a further object of the invention to so arrange the unit that suitable and proper lubrication will be effected for all said parts for either "up" or "down" drive, that is, with the unit set with the sprocket or wheel end of the "low" speed shaft either above or below the driving motor end of the unit. In the latter case the lower end of the vertical shaft is lubricated by sealed grease, and with the oil bath cut off from such lower bearing; in the former case the lower end of the vertical shaft is lubricated by the same oil bath which lubricates the other running parts.

A further feature of the invention relates to the provision of a self-contained unit of very compact form, and with the driving and speed reducing elements compactly inter-related. In this connection it is to be noted that frequently the spaces or clearances through the structural framework of the shop wherein the device is installed are relatively small, so that the portion of the unit reaching down through such structural framework should be small; but a larger space or clearance is needed for accommodation of the gear reduction portions of the unit. It is therefore a further object of the present invention to so arrange said gear reduction portions of the unit that they will be readily accommodated within a casing or housing portion above the supporting framework, with the vertical shaft section extending downwardly therefrom and through the supporting framework.

In connection with the foregoing it is a further object of the invention to bring such gear reduction portions of the unit into very small compass or space, consistent with the loads which they must transmit; and to so arrange these parts that the upper portion of the unit may be brought into a substantially rectangular form, notwithstanding the presence of the double reduction from horizontal high speed shaft to vertical low speed shaft. In this connection it is an object to bring the horizontal high speed or motor shaft to a position where its axis would intersect the vertical low speed shaft, thus bringing the motor shaft to the horizontal center of the unit; and this result I accomplish by a peculiar and special placement of the intermediate shaft with respect to the other parts.

In connection with the foregoing it is a further object of the invention to place the intermediate shaft, together with its worm and other gear members, offset into a corner portion of the rectangular housing or unit, and thereby occupying a portion of said unit housing which would otherwise constitute dead or useless space.

By this means I am enabled to not only provide a more compact unit, but also to reduce the size thereof in one dimension; with consequent savings in costs of manufacture and weight, as well as in the installed space occupied.

In connection with the foregoing it is a further object of the invention to bring the several gear parts into a very advantageous relative positioning with respect to each other so that the tilting forces developed as a result of transmission of driving forces from one element to another will be very small, and so that such forces can be readily taken care of in the shaft bearings. I have already referred to the large forces which must be transmitted to the chain from the sprocket. The arrangements herein disclosed are such that a large separation between the vertical low speed shaft bearings is secured, so that tilting forces created on said shaft are readily taken care of.

Other uses and objects of the present invention will appear from a detailed description of the same, which consists in the features of construction, and combinations of parts hereinafter described and claimed.

Referring now to the drawings, I provide a housing, designated in its entirety by the numeral 20. It includes an upper, rectangular portion, 21, having the feet or pads 22 for mounting on, or connection to, the structural members to which the unit is to be connected. Depending from this upper portion 21 is the well section 23; and this well section is substantially smaller in horizontal section than the upper portion 21.

Reference to Figures 7, 8, 9 and 10 shows the structural frame members 24 and 25, or 26 and 27, to which the present unit is to be attached or carried; the unit being placed above the members 24 and 25, or beneath the members 26 and 27, as the case may be, and the pads 22 are then connected to such members by suitable bolts or the like. It will be noted that when the present unit is placed above the structural members, as in Figures 7 and 8, the well section 23 depends between the structural members 24 and 25 to a position somewhat beneath said members, so that the driven sprocket or wheel on the lower end of the low speed shaft is carried by said shaft of the unit, but at a location beneath said structural members. Conversely, when the present unit is placed inverted as in Figures 9 and 10, the well portion 23 reaches up between the structural members, so as to bring the sprocket or wheel above said members, and with the rectangular portion of the housing, 21, beneath the members. In either case, however, the well portion reaches between the structural members from the rectangular portion of the housing, 21, to the sprocket or wheel being driven at low speed.

It is further noted that said well portion is shown as of generally conical or tapering section. This gives a maximum of strength therein for support of the end bearing of the low speed shaft, presently to be described, and with a minimum of material in said portion of the housing, and with uniform strength for transmission of pull to the conveyor extending in any direction from the present unit. Sometimes the housing is provided with a straight sided portion 28 on said conical or tapered well, and at a location close to the upper portion 21, as when the present unit is to be carried directly by a special cradle which in turn is rockingly or ridingly or otherwise mounted in the structural members, to enable the present unit to shift back and forth on occasion, as for the purpose of compensating for slack in the chain being driven, or to allow for movement under extreme force, as when the chain may become overloaded or otherwise. The form and structures of such a cradle constitute no portion of the present invention, and need not be disclosed herein, in fuller detail.

Figure 4:
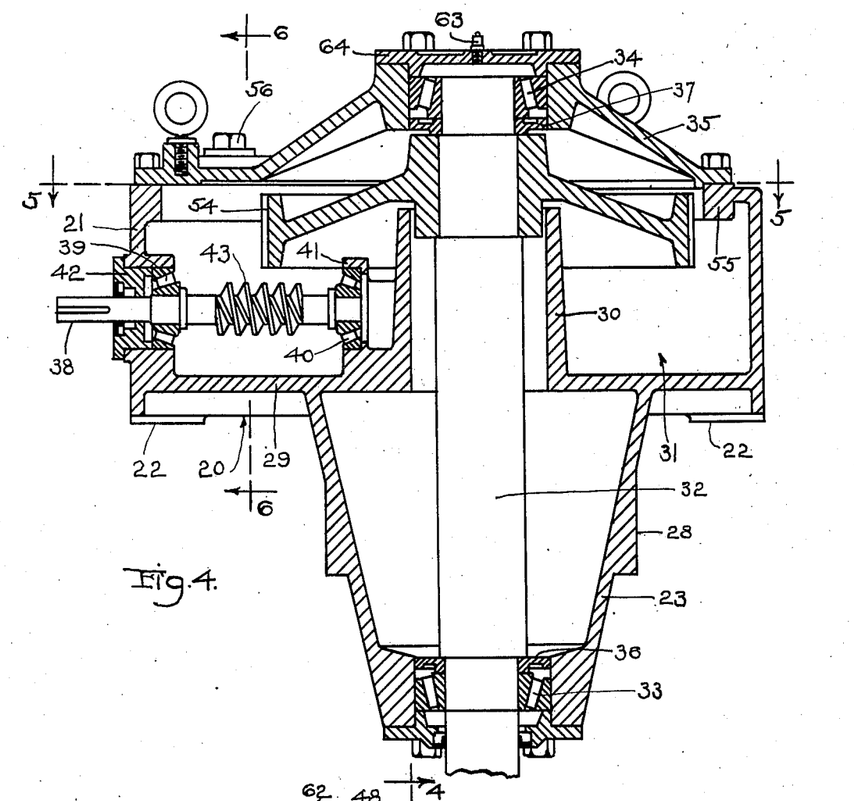
Figure 4 shows an irregular section taken on the line 4—4 of Figures 2 and 3, looking in the directions of the arrows.

The floor 29 of the upper portion 21 of the housing is carried across a portion of the upper end of the conical or well portion 23, as well shown in Figure 4; and the central portion of this floor 29 is carried up in the form of a neck 30 to a position above the oil level, presently to be explained. Thereby there is produced an encircling trough or channel 31 for accommodation of oil, but the level of this oil is always below the upper end of such neck, (when the unit is installed upright as shown in Figure 4), so that the oil within such channel does not run over and down into the well. Still the parts to be lubricated are always well treated by such oil.

The vertical "low" speed shaft 32 extends down through the well and finds a bearing 33 at the lower end of the conical well portion. This bearing 33 is a combined radial and thrust or set bearing, preferably of roller type, as shown. The upper end of this shaft finds a bearing in the bearing 34, carried by the cover or cap plate 35, which cover or cap plate is suitably secured to the edge portion of the rectangular portion of the housing 21, as shown. This bearing 34 is also a combined radial and thrust or set bearing, preferably of the roller type. If desired, and preferably, both of these bearings are of the packed grease type, and suitable grease retainers 36 and 37 are provided therefor.

Figure 1:
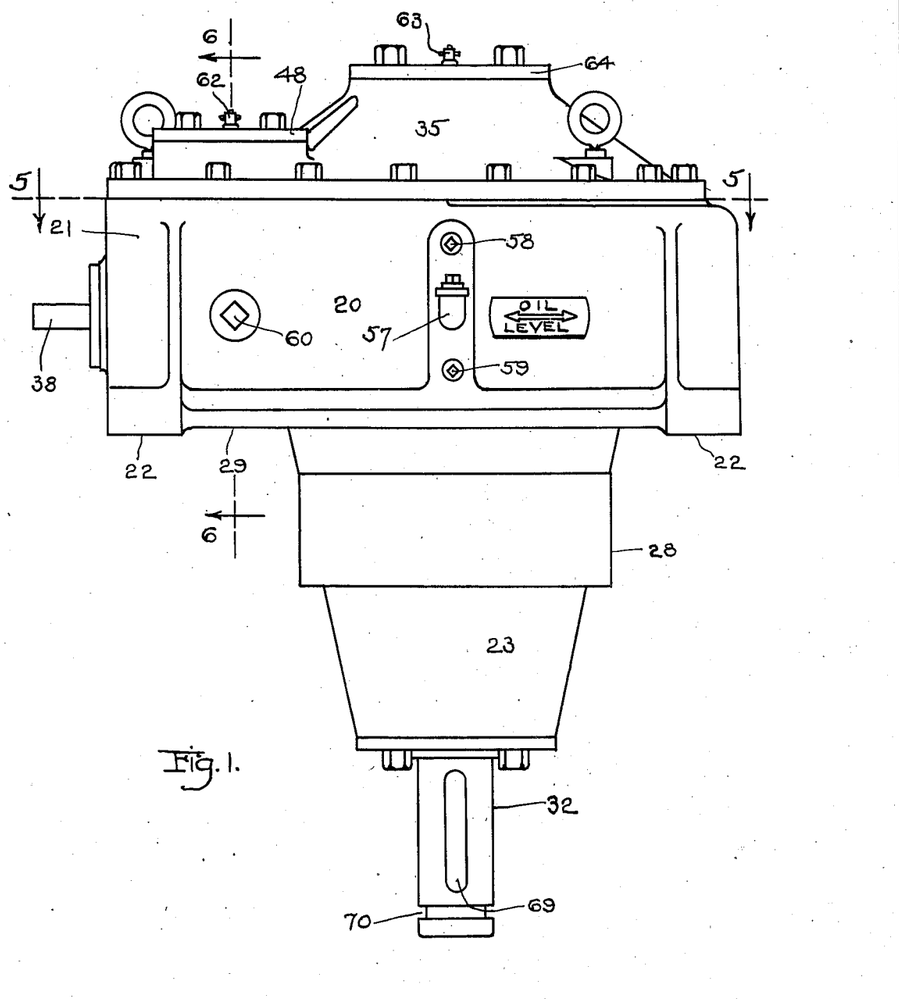
Figure 1 shows a front elevation of a unit embodying the features of my present invention, looking towards the intermediate shaft and gear side of the unit, and with the motor shaft connection at the left of the unit.
Figure 2:
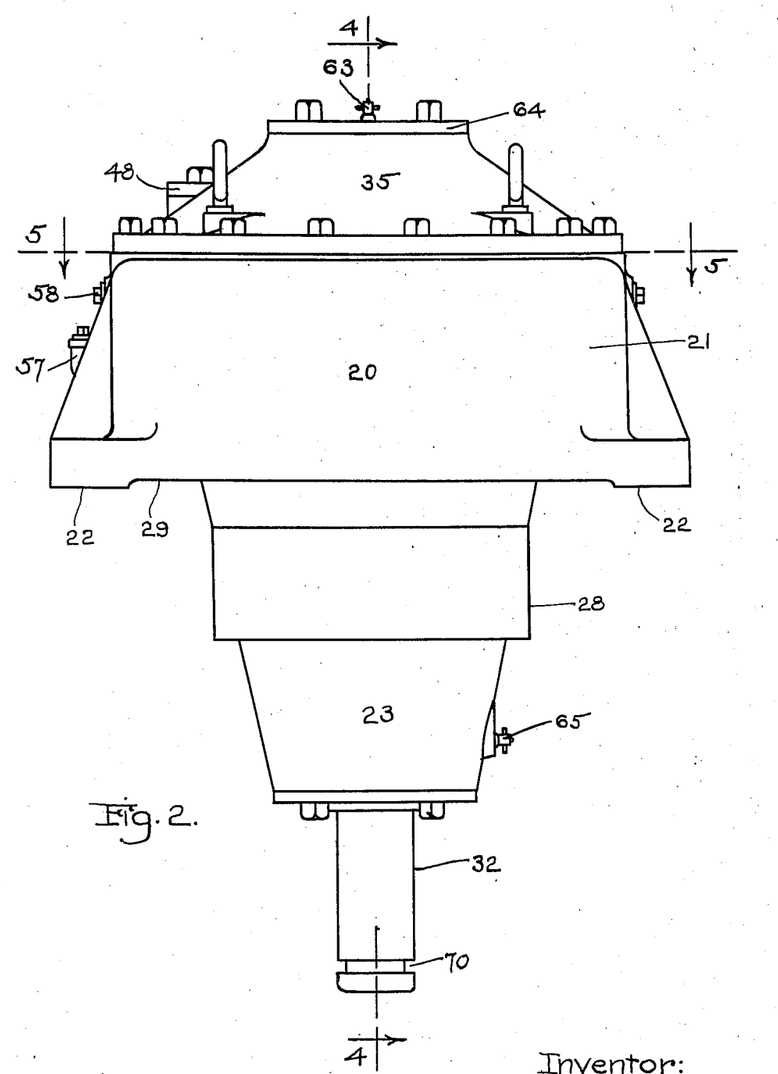
Figure 2 shows a side elevation corresponding to Figure 1, and looking at the side opposite to the motor shaft connection.
Figure 3:
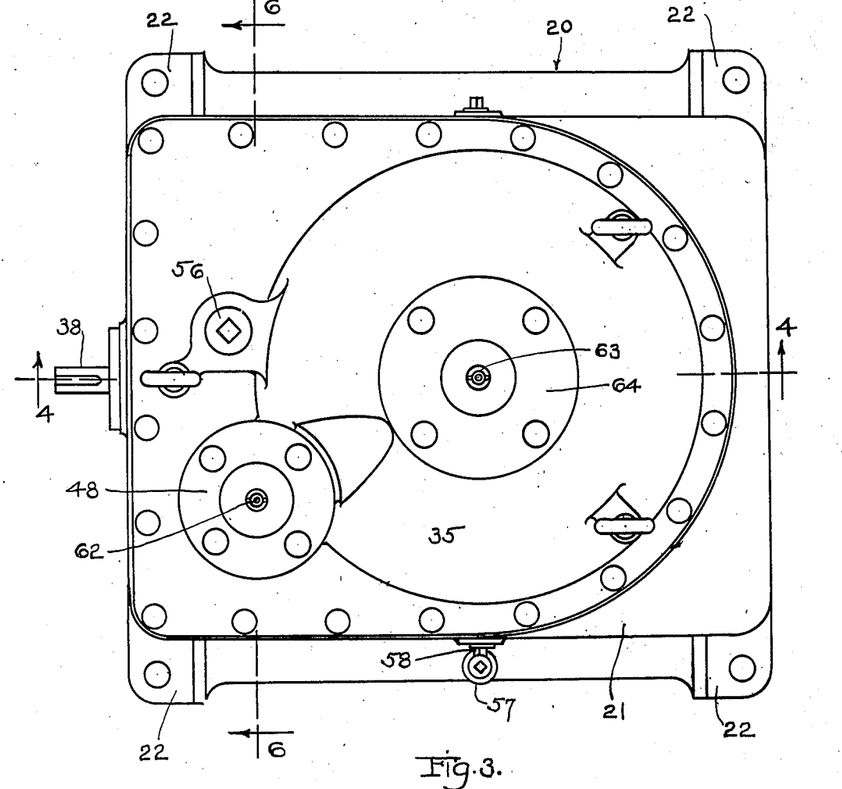
Figure 3 shows a plan view of the unit of Figures 1 and 2.

It will be noted that this vertical shaft occupies a position centrally of the rectangular housing (see Figure 3). There is a "high" speed shaft 38 reaching horizontally into the rectangular portion of the housing, and finding bearings 39 (in the housing wall) and 40 (in a stand 41 carried by the floor 29). These bearings 39 and 40 are also preferably of the combined radial and set or thrust type, and preferably of the roller type, as shown. A suitable ring 42 is set into the wall of the housing to retain the bearing 39 in place therein, and to adjust said bearing by use of shims, or otherwise.

Figure 5:
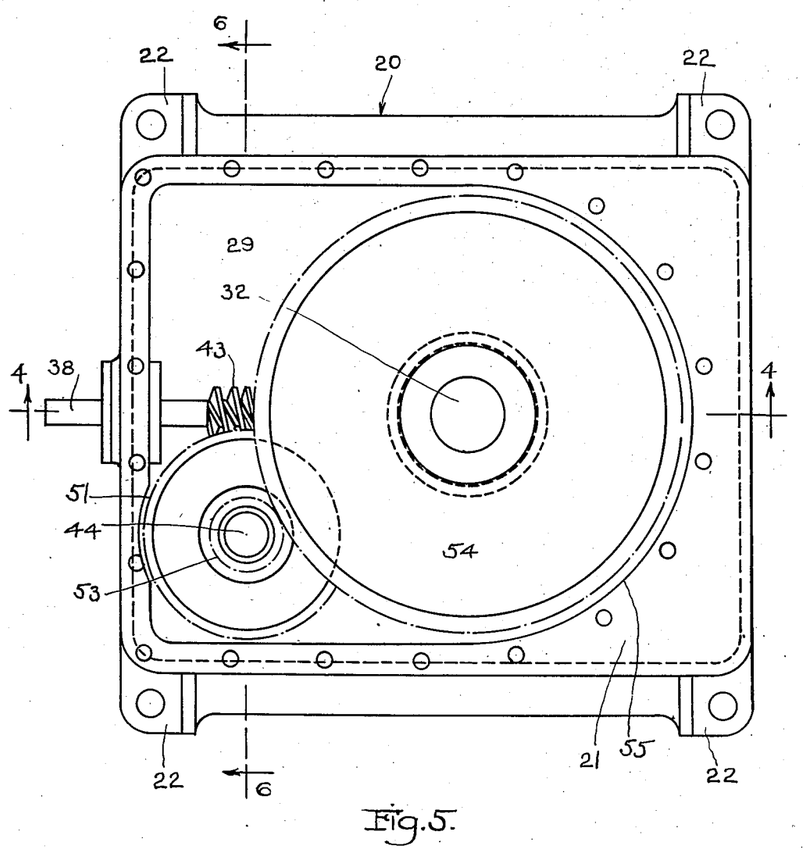
Figure 5 shows a plan section on the lines 5—5 of Figures 1, 2, 4 and 6, looking in the directions of the arrows; being a top or plan view with the cover plate removed.

This high speed shaft carries the worm 43. There is an intermediate shaft 44 extending vertically through the rectangular portion 21 of the housing; and reference to Figures 3 and 5 shows that this intermediate shaft is located in one of the corner portions of the housing, and to one side of the horizontal high speed shaft 38. Said intermediate shaft finds the bearing 45 in the housing floor 29; and a top bearing 46 is provided for said shaft in the cap plate 35. The floor 29 and said cap plate are both provided with openings in line with this intermediate shaft, and through which said bearings may be inserted and adjusted; and these openings are closed by the removable plates 47 and 48, respectively. These bearings 45 and 46 are both combined radial and thrust or set bearings, preferably of the roller type; and suitable shims may, if necessary, be used in conjunction with the plates 47 and 48 to secure proper adjustment of said bearings, to ensure smooth and proper running of the intermediate shaft and associated parts, and to bring the worm and worm gear into exact running alignment. Said bearings 45 and 46 are also preferably of the packed grease type, and suitable grease retainers 49 and 50 may be provided in conjunction with them.

Figure 7:
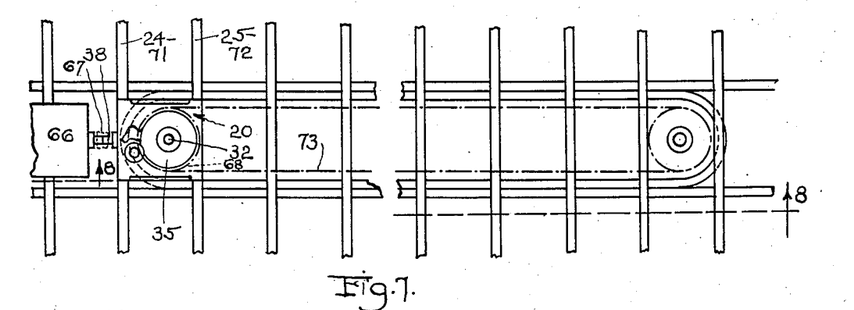
Figure 7 shows a schematic layout of a conveyor system incorporating one of my present disclosed driving units, and with overhead location of the driving unit.
Figure 8:
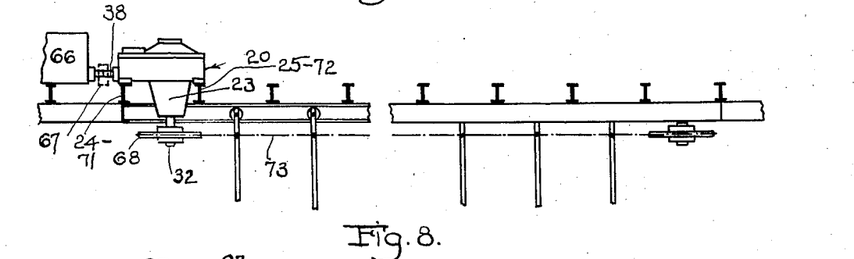
Figure 8 shows a fragmentary elevation corresponding to Figure 7.

The intermediate shaft 44 carries a worm gear 51 which meshes with the worm 45 and is driven thereby; and suitable drive between these parts is ensured by the woodworth key, 52 as shown. The upper portion of the intermediate shaft 44 carries, or has formed therein the pinion element 53; and the upper portion of the low speed or driven shaft 32 carries the gear 54 meshing with said pinion. It is noted, especially from Figure 4, that this gear 54 is dished up, so that its toothed peripheral portion lies considerably below its central or hub portion. By this arrangement I am able to carry the partition 30, which establishes the oil channel, well up, without danger of oil spilling over said partition into the well of the section 23; or conversely, I am able to set the high speed shaft 38, worm 43, and bearings 39 and 40, low enough to ride at least partially in the oil bath, throwing oil up onto the pinion 53 and the teeth of the gear element 54. In other words, I am able to ensure excellent lubrication of all these parts, and at the same time prevent overflow of oil down into the conical well, notwithstanding that the low speed vertical shaft reaches to a point below the horizontal high speed shaft and associated gear parts. This also makes it unnecessary to make special provision against leakage of oil through the lower bearing 33 of the vertical low speed shaft, since that bearing (when using the device installed as shown in Figures 7 and 8), is not flooded with oil but operates as a grease packed bearing.

It is noted that the cover plate 35 is dished up in its central portion to correspond to the dished form of the gear element 54; but this extra height so provided is limited to the central portion of the device, with corresponding limitation of the added amount of material thus needed for providing extra height.

It is here noted that the ring 42 around the high speed shaft is of size to permit endwise insertion or removal of said high speed shaft and worm, so that it is not necessary to split the housing horizontally at the level of said shaft and worm. It is further noted that the upper portion of the rectangular housing may be flanged inwardly, as shown at 55, around at least a portion of the periphery of the device, the cover plate 35 being suitably formed to close the opening so formed in the top of the housing; but the opening in the top of the housing is of proper size and form to permit direct vertical insertion or removal of the low speed shaft and gear elements, as clearly evident from Figure 4 in particular.

Likewise the intermediate shaft 44 together with its associated gear elements, may be set into place or removed directly from above, upon removal of the cover plate 35.

The cover plate may be provided with a suitable oil filler opening, normally plugged by the plug 56; and on one side wall of the rectangular portion of the housing there may be provided a street L 57 for making visible the oil level within the housing. Drain plugs 58 and 59 may be provided above and below said street L; and if desired, a supplemental plug 60 may also be provided in a wall of the rectangular housing portion, and at the normal oil level therein. This plug gives access to an inspection opening in line with the worm and worm gear to inspect same during adjustment.

Suitable alemite or other grease connections such as 61 and 62 may be provided in the plates 47 and 48 in line with the grease lubricated bearings 45 and 46 for the intermediate shaft; and an alemite or other suitable grease connection 63 may be provided in the cap plate 64 directly above the upper bearing 34 of the vertical low speed shaft. Also an alemite or other suitable grease connection 65 may be provided in the lower portion of the conical housing portion 23 for lubricating the lower bearing 33, if needed.

Figure 9:
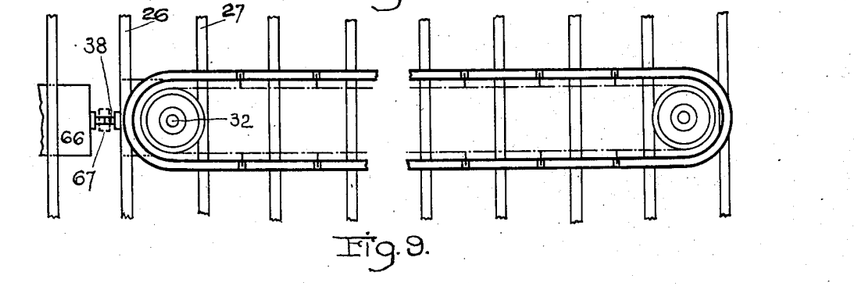
Figure 9 shows another schematic layout of a conveyor system incorporating one of my present driving units, and with floor or low elevation location of the chain system.
Figure 10:
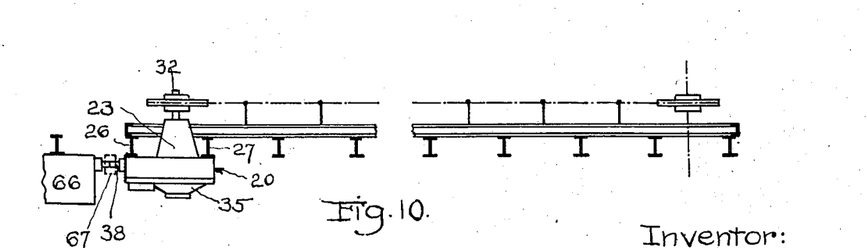
Figure 10 shows a fragmentary elevation corresponding to Figure 9.

Now the gear reduction unit herein disclosed is intended for use either in the upright position shown in Figures 7 and 8, for overhead installation (being the positioning shown also in the various Figures 1 to 6, inclusive), or in inverted installation for low elevation, as shown in Figures 9 and 10. It will be noted that in the first instance (overhead installation) both the bearings 33 and 34 for the vertical low speed shaft, operate with grease lubrication, and that no oil can reach either of these bearings from the oil channel of the upper rectangular housing portion. It will also be noted that with such overhead installation the lower bearing 45 of the intermediate shaft element 44 operates flooded with oil, so that same does not require grease lubrication; but that with such installation the upper bearing 46 of this shaft is to be lubricated by grease. Provision has been made for all such lubrication effects.

It will be noted, however, that when operating the unit in inverted installation, such as shown in Figures 9 and 10, the bearing 34 of the low speed shaft becomes flooded with oil, so that the grease connection 63 may be removed and the hole therefor plugged; also that with such inverted installation the bearing 46 of the intermediate shaft becomes flooded with oil, whereas the bearing 45 for said shaft is no longer flooded with oil; so that the grease connection 62 should be removed and the hole therefor plugged; and with such inverted installation the grease connection 61 should be used. When operating with upright installation, as in Figures 6 and 7 these two bearings are operated, preferably the bearing 45 without grease connection, and the bearing 46 with grease connection.

It is also to be noted that when inverting the unit for floor level installation, the street L 57 should be given a half turn so that it will again stand upright for proper indication of oil level, since it is intended that for operation either upright or inverted the oil level should be substantially at the level of the axis of the high speed shaft 38.

This gear reducer unit is to be driven in suitable manner, as by the motor 66 through the close coupling 67, or otherwise. I do not herein show these arrangements in detail as they may be of convenient and selected form.

Generally the driven sprocket or wheel for the conveyor chain is directly carried by the projecting end portion of the low speed shaft 32. Thus in several figures I have shown the sprocket wheel 68 directly mounted on the end portion of said shaft, and suitably keyed thereto by a key in the key-way 69. Now when operating with overhead installation this sprocket or wheel will be overhead and above the zone of human occupancy in the shop, so it is necessary to make the best possible provision against dropping of said sprocket or wheel away from said shaft. To this effect I have shown the circular groove 70 in the end of the shaft 32, which groove receives a suitable locking ring to retain the sprocket or wheel in place and against any such dropping away from the shaft.

Figure 6:
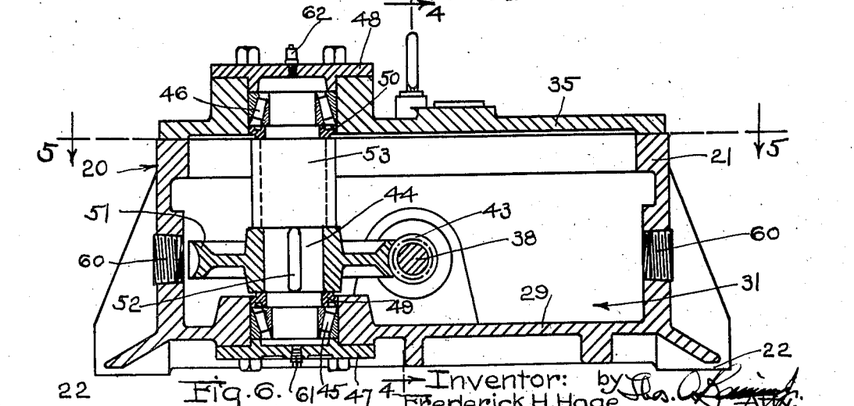
Figure 6 is a vertical section on the lines 6—6 of Figures 1, 3, 4 and 5, looking in the directions of the arrows.

Referring to Figures 6 and 7, I have therein shown the present unit as installed above the structural frame members 71 and 72, upon which the unit rests, the pads 22 being bolted or otherwise secured to said frame members; and it will be noted that the lower or tapered portion 23 of the housing extends down between these frame members to a position where the sprocket or wheel lies in a horizontal plane beneath the frame members. The chain or conveyor 73 then travels over said sprocket or wheel in a run having substantially horizontal paths of travel. Conversely, when the present unit is installed in inverted manner, as in Figures 9 and 10, said unit is located beneath the structural frame members, to which it is attached, and the shaft 32 then reaches vertically up between these frame members to a position above them, the sprocket or wheel being then located above the frame members, where the conveyor run is also located.

I wish to emphasize the fact that a substantially rectangular form of housing is desirable in units intended for installation on structural forms and in such locations as the intended uses and installations of these units; since with such rectangular form the housing may be readily attached to and receive rugged support from, the structural frame members. Thus, in the present case there are provided the pads 22 at the four corners of the housing portion. Still, the gear element 54 is necessarily circular in form, so that the rectangular dimensions of such housing must be made to conform to the diameter of such gear element. Such being the case it follows that there are unoccupied corners in the housing itself, constituting waste space. It is seen that in the present arrangement I have placed the vertical intermediate shaft element 44, together with its gear and pinion elements, in one of these corner spaces of the rectangular portion of the housing and offset from the central transverse or medial plane of the housing, so that the incoming or high speed horizontal shaft 38, together with its worm element, may be brought directly into the unit from the middle of one side for proper meshing engagement with the worm gear on the vertical intermediate shaft, and also to bring the pinion of the vertical intermediate shaft into mesh with the low speed gear at a location in the corner portion of the housing. In other words, the vertical intermediate shaft may thus be set inwards considerably farther than would otherwise have been possible, thus materially reducing the dimension of the rectangular portion of the housing in one direction. This fact will be readily apparent from examination of Figures 3 and 5 in particular. This results in material reduction of weight and size, as well as cost of the unit. This result is also a direct result of the placement of the low speed gear element 54 above the level of the high speed horizontal shaft 38, with its worm 43, since said high speed shaft and worm are brought inwards far enough to properly meet the worm gear of the vertical intermediate shaft, said intermediate shaft then having its pinion above its worm gear and in planar relation to the teeth of the low speed gear element 54.

It is further noted that by carrying the tapered portion 23 of the housing element down far enough to reach through the structural members, not only do I bring the end of the low speed shaft into proper position for reception of the sprocket or wheel, but I am also able to set the bearings 33 and 34 of the low speed shaft very far apart, both supported by the same structure or unit, so that a very rigid support is provided for the low speed shaft. This is very important since this shaft rotates at very low speed, but must exert a very great pull on the run of the conveyor being driven and such forces tend to tilt this low speed shaft, and throw it out of line. Such tilting force is well taken care of by the present arrangement. Such tapered downwardly extending portion of the housing, in conjunction with the rectangular box-like upper housing portion gives an extremely rigid support for all the power transmitting elements, in addition to giving extremely rigid support for the lower bearing of the low speed shaft, which bearing is also located close to the point of sprocket or wheel attachment, so that the pull to be exerted by such sprocket or wheel is taken directly by such lower bearing and then transmitted directly to the tapered portion of the housing, by which it is transmitted directly to the rectangular box-like portion of the housing which is in turn rigidly attached to the structural members at points well separated from each other so that these loads are thus well transmitted to said structural members.

I claim:

1. A gear speed reducer unit for the purpose described, comprising in combination a rectangular box-like housing having a floor and also having a central downwardly extending tapered well, and also having an upwardly extending flange reaching upwardly in said rectangular housing portion around the position of the well, a high speed shaft extending horizontally into the rectangular housing portion radially with respect to the vertical axis of the well, suitable bearings for said high speed shaft adjacent to the outer wall of the housing and also adjacent to the upwardly extending flange aforesaid, a vertical intermediate shaft within the rectangular housing portion and located in one corner portion of said housing portion, a worm on the high speed shaft, a worm gear on the intermediate shaft meshing with said worm, a low speed shaft extending vertically through the well and the housing to a position above the level of the flange aforesaid, a low speed gear on said shaft above said flange, said low speed gear being dished downwardly to bring its toothed peripheral portion to a level below the upper edge of the flange, and a pinion on the intermediate shaft meshing with said peripheral portion of the low speed gear, substantially as described.

2. A gear speed reducer unit for the purpose specified, comprising in combination a rectangular box-like structure having a floor and also having a central downwardly extending well portion, and also having an upwardly extending flange reaching upwardly in said rectangular housing portion around the position of the well, a high speed shaft extending horizontally into the rectangular housing portion radially with respect to the vertical axis of the well, suitable bearings for said high speed shaft adjacent to the outer wall of the housing and also adjacent to the upwardly extending flange aforesaid, a vertical intermediate shaft within the rectangular housing portion and located in one corner portion of said housing portion, a worm on the high speed shaft, a worm gear on the intermediate shaft meshing with said worm, a low speed shaft extending vertically through the well and the housing to a position above the level of the flange aforesaid widely separated bearings for said low speed shaft, one of which bearings is at the lower end of said well portion extension, and the other of which bearings is in said box-like housing opposite to the floor thereof, a low speed gear on said shaft above said flange, and a pinion on the intermediate shaft meshing with said low speed gear, substantially as described.

3. A gear speed reducer unit for the purpose specified, comprising in combination a rectangular box-like housing having a floor and also having a central downwardly extending extension, and also having an upwardly extending flange reaching upwardly in said rectangular housing portion around the position of said downward extension, a high speed shaft extending horizontally into the rectangular housing portion radially with respect to the vertical axial line of said extension, suitable bearings for said high speed shaft adjacent to the outer wall of the housing and also adjacent to the upwardly extending flange aforesaid, a vertical intermediate shaft within the rectangular housing portion and located in one corner portion of said housing portion, a worm on the high speed shaft, a worm gear on the intermediate shaft meshing with said worm, a low speed shaft extending vertically through the extension and the housing to a position above the level of the flange aforesaid widely separated bearings for said low speed shaft, one of which bearings is at the lower end of said well portion extension, and the other of which bearings is in said box-like housing opposite to the floor thereof, a low speed gear on said shaft above said flange, and a pinion on the intermediate shaft meshing with said low speed gear, substantially as described.

4. A gear speed reducer unit for the purpose specified, comprising in combination a rectangular box-like housing having a floor and also having a central downwardly extending extension, and also having an upwardly extending flange reaching upwardly in said rectangular housing portion around the position of said downward extension, a high speed shaft extending horizontally into the rectangular housing portion, suitable bearings for said high speed shaft, a vertical intermediate shaft within the rectangular housing portion and located to one side of said high speed shaft and in one corner portion of said rectangular housing portion, a worm on the high speed shaft, a worm gear on the intermediate shaft meshing with said worm, a low speed shaft extending vertically through the extension and the housing to a position above the level of the flange aforesaid widely separated bearings for said low speed shaft, one of which bearings is at the lower end of said well portion extension, and the other of which bearings is in box-like housing opposite to the floor thereof, a low speed gear on said shaft above said flange, and a pinion on the intermediate shaft meshing with said low speed gear, substantially as described.

5. A gear speed reducer unit for the purpose specified, comprising in combination a rectangular box-like housing having a downwardly extending extension at right angles to the body of said box-like housing and centrally thereof, suitable attaching means on the corner portions of said box-like housing at the extension face thereof, said attaching means being for attachment to structural members adjacent to said face of said housing, a vertically extending low speed shaft reaching axially through said extension and through the housing, a low speed gear on said shaft within the rectangular housing portion, bearings for said low speed shaft, one above said gear, and the other at the extreme end of said extension, whereby said bearings are separated from each other a maximum distance, a sprocket or wheel on the end of the low speed shaft adjacent to the extension bearing thereof, a high speed shaft reaching through the rectangular housing horizontally, suitable bearings for said high speed shaft, a worm on said high speed shaft, a vertical intermediate shaft within the rectangular housing portion, a worm gear on said intermediate shaft meshing with the worm of the high speed shaft, and a pinion on the intermediate shaft meshing with the low speed shaft gear, substantially as described.

6. A gear speed reducer unit for the purpose specified, comprising in combination a rectangular box-like housing having a downwardly extending extension at right angles to the body of said box-like housing and centrally thereof, suitable attaching means on the corner portions of said box-like housing at the extension face thereof, said attaching means being for attachment to structural members adjacent to said face of said housing, a vertically extending low speed shaft reaching axially through said extension and through the housing, bearings for said low speed shaft, one adjacent to the housing end of said shaft, and the other adjacent to the lower end of said shaft, a gear on said shaft adjacent to said first mentioned bearing, a sprocket or wheel on said shaft adjacent to the last mentioned bearing, a high speed shaft reaching through the housing and terminating adjacent to the position of the low speed shaft, a worm on said high speed shaft, an intermediate shaft extending through the housing parallel to the low speed shaft, a worm gear on said intermediate shaft meshing with the worm of the high speed shaft, and a pinion on said intermediate shaft meshing with the gear of the low speed shaft, substantially as described.

7. A gear speed reducer for the purpose specified, comprising in combination an invertable unit including a rectangular housing of box-like formation having a tapered extension reaching from one of its faces at right angles and centrally of such face, there being a passage through the housing and such extension, a shaft extending transversely of said housing and axially of the extension, bearings for said shaft, one at the end portion of the extension, and the other at the face of the box-like housing opposite to said extension, suitable attaching means on said housing at the extension face thereof, a high speed shaft reaching partially across the housing at right angles to the low speed shaft, bearings for said high speed shaft, a worm on the high speed shaft, an intermediate shaft parallel to the low speed shaft and extending across the housing, bearings for said intermediate shaft, a worm gear on said intermediate shaft, a low speed gear on the low speed shaft within the housing, and a pinion on the intermediate shaft meshing with said gear, substantially as described.

8. A gear speed reducer unit comprising in combination a rectangular housing, relatively shallow in comparison to its horizontal dimensions, a tapered extension extending downwardly from one of the broad faces of said housing, and communicating with the interior of the housing, a low shaft extending axially through said extension and across the housing, journals for said low speed shaft, one adjacent to the extreme end of the tapered extension, and the other adjacent to the broad face of the housing, a low speed gear on said low speed shaft adjacent to said last named bearing, said gear being dished to bring its peripheral edge portion closer to that face of the housing to which the extension connects, a high speed shaft extending across a portion of the housing parallel to the broad faces thereof and between the edge portion of the low speed gear and that face of the housing to which the extension connects, an intermediate shaft extending across the housing between the broad faces thereof, and adjacent to the high speed shaft, worm and worm gear driving connections between the high speed and intermediate shafts, and a pinion on the intermediate shaft meshing with the low speed shaft gear, substantially as described.

9. A gear speed reducer unit comprising in combination a rectangular housing, relatively shallow in comparison to its horizontal dimensions, an extension extending downwardly from one of the broad faces of said housing and centrally thereof, a low speed shaft extending axially of the said extension and across the housing to the broad face thereof opposite to the said extension, bearings for said shaft, one in the extension close to the end thereof farthest removed from the rectangular housing, and the other in the face of the housing opposite to said extension, whereby said bearings are separated from each other a maximum distance within the confines of the unit, a high speed shaft extending across the housing at right angles to said low speed shaft, suitable bearings for said high speed shaft, an intermediate shaft extending across the housing paralllel to the low speed shaft, suitable bearings for said intermediate shaft, worm and worm gear connections drivingly connecting the high speed shaft and the intermediate shaft, and suitable gear connections drivingly connecting the intermediate shaft and the low speed shaft, together with attaching means on the housing adjacent to the corners thereof, whereby said unit provides very rigid and strong supports for the low speed shaft with respect to said attaching means, to resist displacement of the low speed shaft end closest to the first mentioned bearing with respect to the attaching means, whereby said end of the low speed shaft may transmit large forces to objects external to said unit, and whereby said low speed shaft is effectively supported by bearings separated from each other a maximum distance within the confines of the unit to thereby resist tilting of said low speed shaft by forces exerted by said shaft on objects external to the unit, substantially as described.

FREDERICK H. HOGE.